United States Patent [19]

Takagi et al.

[11] Patent Number: 5,345,601
[45] Date of Patent: Sep. 6, 1994

[54] HARMONIC-FREQUENCY COMMUNICATION SYSTEM WITH IMPROVED DIVERSITY SCHEME

[75] Inventors: Tasuku Takagi; Zenichirou Nagasawa, both of Sendai, Japan

[73] Assignee: Small Power Communication Systems Research Laboratories Co., Ltd., Sendai, Japan

[21] Appl. No.: 885,983

[22] Filed: May 20, 1992

[30] Foreign Application Priority Data

Aug. 7, 1991 [JP] Japan .................. 3-197840

[51] Int. Cl.$^5$ .............. H04B 7/08; H04B 7/12
[52] U.S. Cl. ..................... 455/59; 455/103; 455/134; 455/137
[58] Field of Search ........... 455/59, 52.1, 17, 133, 455/134, 135, 137, 201, 202, 273, 275, 276.1, 101, 277.1, 277.2, 103, 112, 114, 118

[56] References Cited

U.S. PATENT DOCUMENTS

| | | |
|---|---|---|
| 1,954,185 | 4/1934 | Sedlmayer . |
| 2,955,199 | 10/1960 | Mindes . |
| 3,023,309 | 2/1962 | Foulkes . |
| 3,310,742 | 3/1967 | Adams ................ 455/59 |
| 4,584,716 | 4/1986 | Drentea . |
| 4,615,040 | 9/1986 | Mojoli et al. ........... 455/59 |
| 4,850,037 | 7/1989 | Bochmann ............ 455/137 |
| 4,881,245 | 11/1989 | Walker et al. .......... 455/59 |
| 5,034,997 | 7/1991 | Iwasaki .............. 455/101 |

FOREIGN PATENT DOCUMENTS

869361 3/0553 Fed. Rep. of Germany .

Primary Examiner—Reinhard J. Eisenzopf
Assistant Examiner—Nguyen Vo
Attorney, Agent, or Firm—Oblon, Spivak, McClelland, Maier & Neustadt

[57] ABSTRACT

According to this invention, a modulator modulates a carrier serving as a fundamental wave with data to be transmitted, thereby to generate a modulated output including at least the fundamental wave and double wave thereof. A transmitting antenna radiates electromagnetic waves into the air, and the electromagnetic waves include the fundamental wave and the double wave included in the modulated output generated by the modulator. A receiving antenna receives the electromagnetic waves including the fundamental wave and the double wave radiated from the transmitting antenna. A diversity section generates an output having a diversity effect on the basis of the fundamental wave and the double wave included in the electromagnetic waves received by the receiving antenna. A demodulator demodulates the output having the diversity effect and generated by the diversity section, thereby to output data corresponding to the data to be transmitted.

10 Claims, 6 Drawing Sheets

HARMONIC-FREQUENCY COMMUNICATION SYSTEM WITH IMPROVED DIVERSITY SCHEME

BACKGROUND OF THE INVENTION

1. Field of the Invention

The present invention generally relates to a diversity scheme communication system and, more particularly, to a communication system using weak radio waves, i.e., a harmonic-frequency communication system with an improved diversity scheme for performing data communication using the fundamental and harmonic-frequency waves of electromagnetic waves generated from the output of a transmission side.

2. Description of the Related Art

In a radio communication system, the fundamental wave of electromagnetic waves is generally used. Such a communication system is suppressed by interference waves generated near the communication system. In order to solve this problem, there is provided a communication system with a frequency diversity scheme in which data communication is performed by superposing the same data on a plurality of carriers.

Figure 8:
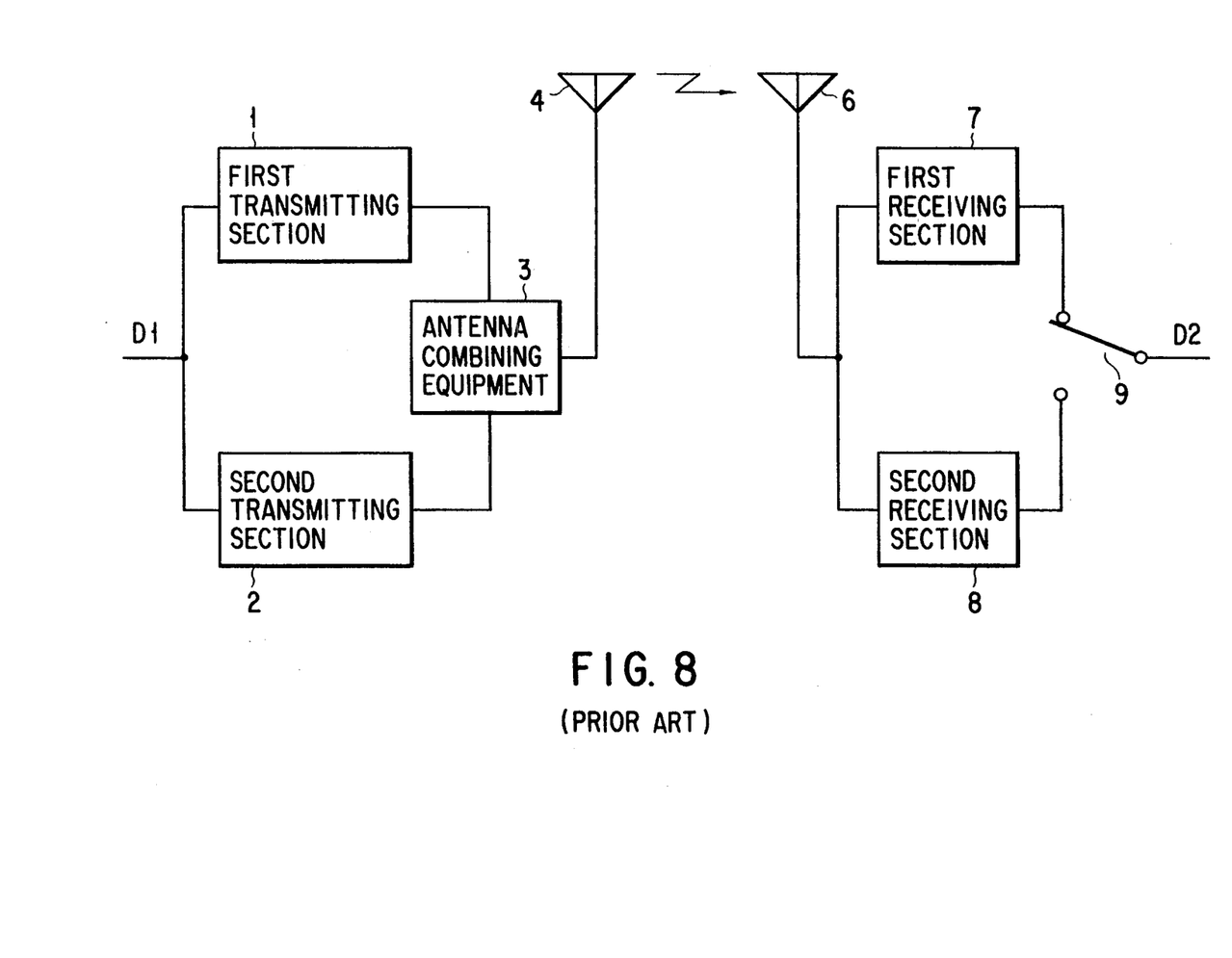
FIG. 8, is a view for explaining an arrangement of a communication system with a conventional frequency diversity scheme.

FIG. 8 is a block diagram showing a conventional diversity scheme communication system. Data D1 is input to first and second transmitting sections 1 and 2. The first transmitting section 1 modulates the data D1 and superposes it on a first carrier. The second transmitting section 2 modulates the data D1 and superposes it on a second carrier. As a result, the data D1 is radiated in the air as electromagnetic waves by a transmitting antenna 4 via an antenna combining equipment 3. The radiated electromagnetic waves travel in the air and are received by a receiving antenna 6. The received electromagnetic waves are input to a first receiving section 7 for the first carrier and to a second receiving section 8 for the second carrier, so that data are demodulated from the carriers and output. The quality levels of demodulated data are compared by some method, and one data of better quality is selected by a switch 9 and output therefrom as data D2.

In the conventional communication system, however, the following drawback is posed. That is, in addition to an antenna combining equipment, a plurality of transmitting sections are required for transmitting a plurality of carriers, thereby complicating the arrangement of the communication system.

SUMMARY OF THE INVENTION

It is, therefore, an object of the present invention to provide a new and advanced harmonic frequency communication system with an improved diversity scheme which uses fundamental and harmonic-frequency waves, which can achieve radio communication well protected against interference waves and fading, and which does not require a plurality of transmitting and receiving sections to simplify a transmitting section and decrease the size of the system.

According to a first aspect of the present invention, there is provided a harmonic-frequency communication system, comprising:

a transmitting section including:
modulation means for modulating a carrier serving as a fundamental wave with data to be transmitted, thereby to generate a modulated output including at least the fundamental wave and a double wave thereof; and
transmitting antenna means for radiating electromagnetic waves into the air, the electromagnetic waves including the fundamental wave and the double wave included in the modulated output generated by the modulation means; and a receiving section including:
receiving antenna means for receiving the electromagnetic waves including the fundamental wave and the double wave radiated from the transmitting antenna means;
diversity means for generating an output having a diversity effect on the basis of the fundamental wave and the double wave included in the electromagnetic waves received by the receiving antenna means; and
demodulation means for demodulating the output having the diversity effect and generated by the diversity means, thereby to output data corresponding to the data to be transmitted.

According to a second aspect of the present invention, there is provided a harmonic-frequency communication system, comprising:

a transmitting section including:
modulation means for modulating a carrier serving as a fundamental wave with data to be transmitted, thereby to generate a modulated output including at least the fundamental wave and a double wave thereof; and
transmitting antenna means for radiating electromagnetic waves into the air, the electromagnetic waves including the fundamental wave and the double wave included in the modulated output generated by the modulation means; and a receiving section including
receiving antenna means for receiving the electromagnetic waves including the fundamental wave and the double wave radiated from the transmitting antenna means;
demodulation means for independently demodulating the fundamental wave and the double wave included in the electromagnetic waves received by the receiving antenna means, thereby to independently output data corresponding to the data to be transmitted; and
diversity means for outputting data having a diversity effect on the basis of demodulated data extracted from the fundamental wave independently modulated and output by the demodulation means.

According to a third aspect of the present invention, there is provided a harmonic-frequency communication method, comprising the steps of:

modulating a carrier serving as a fundamental wave with data to be transmitted, thereby to generate a modulated output including at least the fundamental wave and a double wave thereof;
radiating electromagnetic waves in the air, the electromagnetic waves including the fundamental wave and the double wave included in the modulated output;
receiving the electromagnetic waves including the fundamental wave and the double wave radiated in the air; and
demodulating the fundamental wave and the double wave having a diversity effect, the fundamental wave and the double wave being included in the received electromagnetic waves, thereby to output data corresponding to the data to be transmitted.

Additional objects and advantages of the invention will be set fourth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and together with the general description given above the detailed description of the preferred embodiments given below, serve to explain the principles of the invention.

DETAILED DESCRIPTION OF THE PREFERRED EMBODIMENT

Reference will now be made in detail to the presently preferred embodiments of the invention as illustrated in the accompanying drawings, in which like reference characters designate like or corresponding parts throughout the several drawings.

First, the present invention will be generally described below.

In a harmonic-frequency communication system according to the present invention, in order to solve the above conventional drawbacks, a transmitting section is simplified by using a series of harmonic waves radiated from the transmitting section.

According to the present invention, in a harmonic-frequency communication system using weak radio waves, a communication well protected against interference waves and fading is realized by employing diversity scheme improved by using especially the fundamental wave of electromagnetic waves, i.e., harmonic waves. More specifically, since this communication system does not require a plurality of transmitting sections for transmitting a plurality of carriers, a simple transmitting section can be obtained.

Several embodiments of the present invention on the basis of the above general description will be described below with reference to the accompanying drawings.

Figure 1:
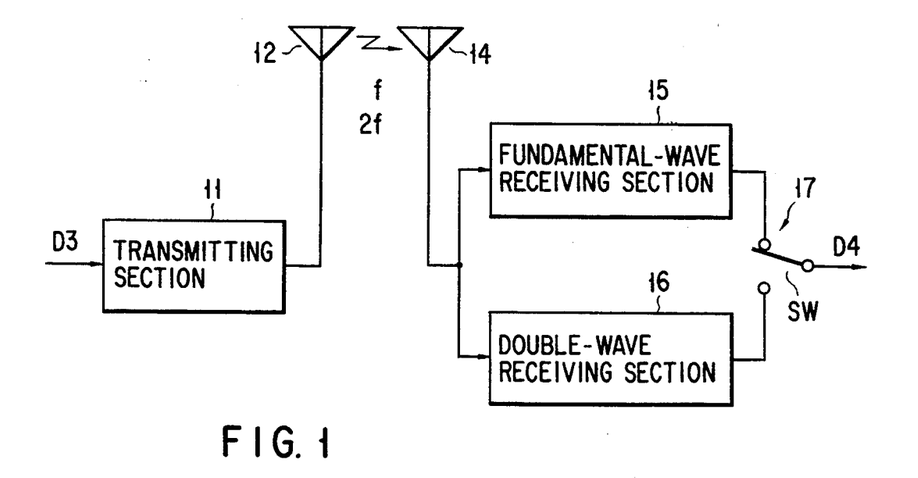
FIG. 1 is a block diagram showing an arrangement of a harmonic-frequency communication system according to the first embodiment of the present invention.

FIG. 1 is a block diagram showing a harmonic-frequency communication system according to the first embodiment of the present invention. That is, according to the first embodiment, a fundamental wave f and a double wave $2f$ thereof are used as a plurality of carriers. In FIG. 1, data D3 is input to a transmitting section 11, modulated and amplified therein, and radiated as electromagnetic waves from a transmitting antenna 12. A fundamental wave and a double wave are radiated as the electromagnetic waves. The radiated electromagnetic waves travel in the air, and they are received by a receiving antenna 14 and input to a fundamental-wave receiving section 15 and a double-wave receiving section 16. The fundamental-wave receiving section 15 demodulates data from the fundamental wave and outputs the data. The double-wave receiving section 16 demodulates data from the double wave and outputs the data. A switch SW serving as a diversity section 17 compares the demodulated data output from the fundamental-wave receiving section 15 and the double-wave receiving section 16 by some method and selectively outputs one data of better quality as data D4.

Figure 2:
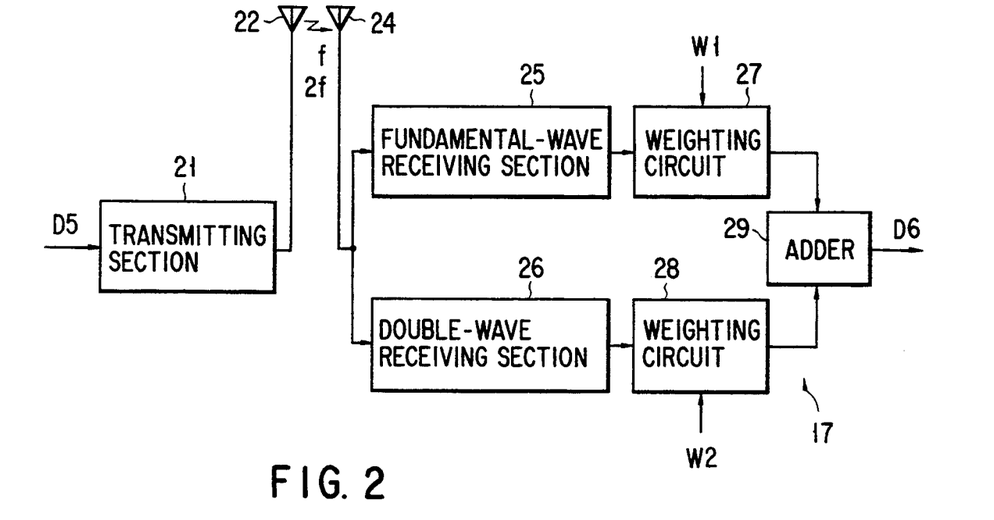
FIG. 2 is a block diagram showing an arrangement of a harmonic-frequency communication system according to the second embodiment of the present invention.

FIG. 2 is a block diagram showing a harmonic-frequency communication system according to the second embodiment of the present invention. That is, according to the second embodiment, a fundamental wave f and a double wave $2f$ thereof are used as a plurality of carriers. In FIG. 2, data D5 is input to a transmitting section 21, modulated and amplified therein, and radiated as electromagnetic waves from a transmitting antenna 22. A fundamental wave and a double wave are radiated as the electromagnetic waves. The radiated electromagnetic waves travel in the air, and they are received by a receiving antenna 24 and input to a fundamental-wave receiving section 25 and a double-wave receiving section 26. The fundamental-wave receiving section 25 demodulates data from the fundamental wave and outputs the data. The double-wave receiving section 26 demodulates data from the double wave and outputs the data. After the demodulated data output from the fundamental-wave receiving section 25 and the double-wave receiving section 26 are weighted with predetermined weighting coefficients W1 and W2 by weighting circuits 27 and 28 included in a diversity section 17, respectively, the demodulated data are added to each other by an adder 29 so as to be output as data D6 having a diversity effect.

Figure 3:
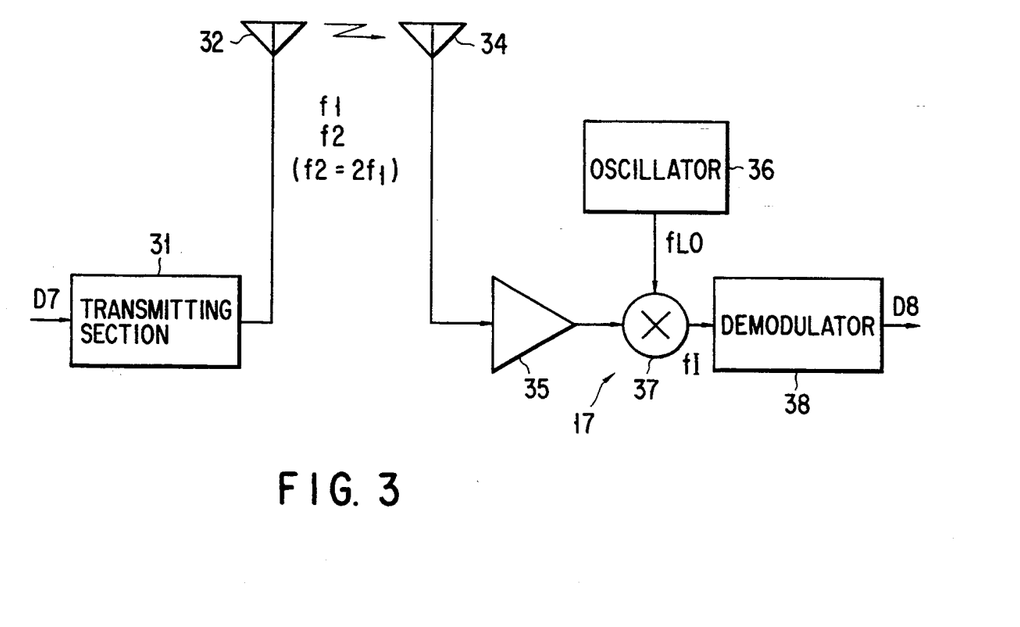
FIG. 3 a block diagram showing a harmonic-frequency communication system according to the third embodiment of the present invention.
Figure 4:
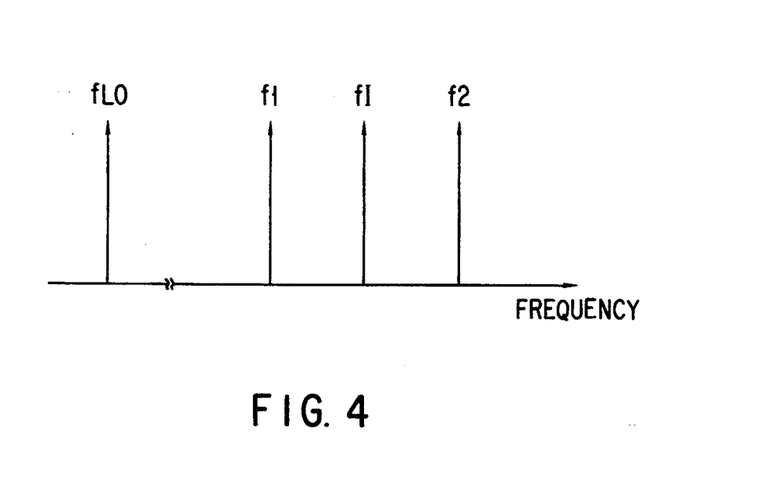
FIG. 4 is a view showing a relationship between the frequency spectra of the transmitting and receiving sections in FIG. 3.

FIG. 3 is a block diagram showing a harmonic-frequency communication system according to the third embodiment of the present invention. FIG. 4 is a relationship between the frequency spectra of the harmonic-frequency communication system of the third embodiment. According to this embodiment, a fundamental wave $f_1$ and a double wave $f_2$ thereof are used as a plurality of carriers. In FIG. 3, data D7 is input to a receiving section 31, modulated and amplified therein, and radiated as electromagnetic waves from a transmitting antenna 32. A fundamental wave and a double wave are radiated as the electromagnetic waves. The radiated electromagnetic waves travel in the air, and they are received by a receiving antenna 34 and input to a mixer 37 through an amplifier 35. The mixer 37 included in a diversity section 17 produces a signal having a frequency $f_1+F_{LO}$ and a signal having a frequency $f_2-F_{LO}$ from the fundamental wave $f_1$, the double wave $f_2$, and a signal $f_{LO}$ generated by a generator 36. At this time, the frequency of the signal $f_{LO}$ generated by the generator 36 is set to satisfy condition $f_1+f_{LO}=f_2-f_{LO}$. An output signal $f_f$ from the mixer 37 is produced by synthesizing the signal having the frequency $f_1+f_{LO}$ and the signal having the frequency $f_2-f_{LO}$, and the output signal $f_1$ has a diversity effect. The output signal $f_I$ from the mixer 37 is demodulated by a demodulation section 38 to be output as data D8.

In the above embodiments, a series of harmonic waves each having a frequency higher than that of a triple harmonic wave in addition to the fundamental wave and the double wave thereof are simultaneously output from the transmitting sections 11, 21, and 31. However, since these harmonic waves have low levels enough to be negligible, the harmonic wave can be removed by the frequency selecting function of each of the receiving sections. In this case, a band-pass filter or the like for removing a harmonic component having a frequency higher than that of a triple wave may be arranged in each of the transmitting sections.

On the above embodiments, several practical arrangements of the first embodiment will be described below with reference to the accompanying drawings.

Figure 5:
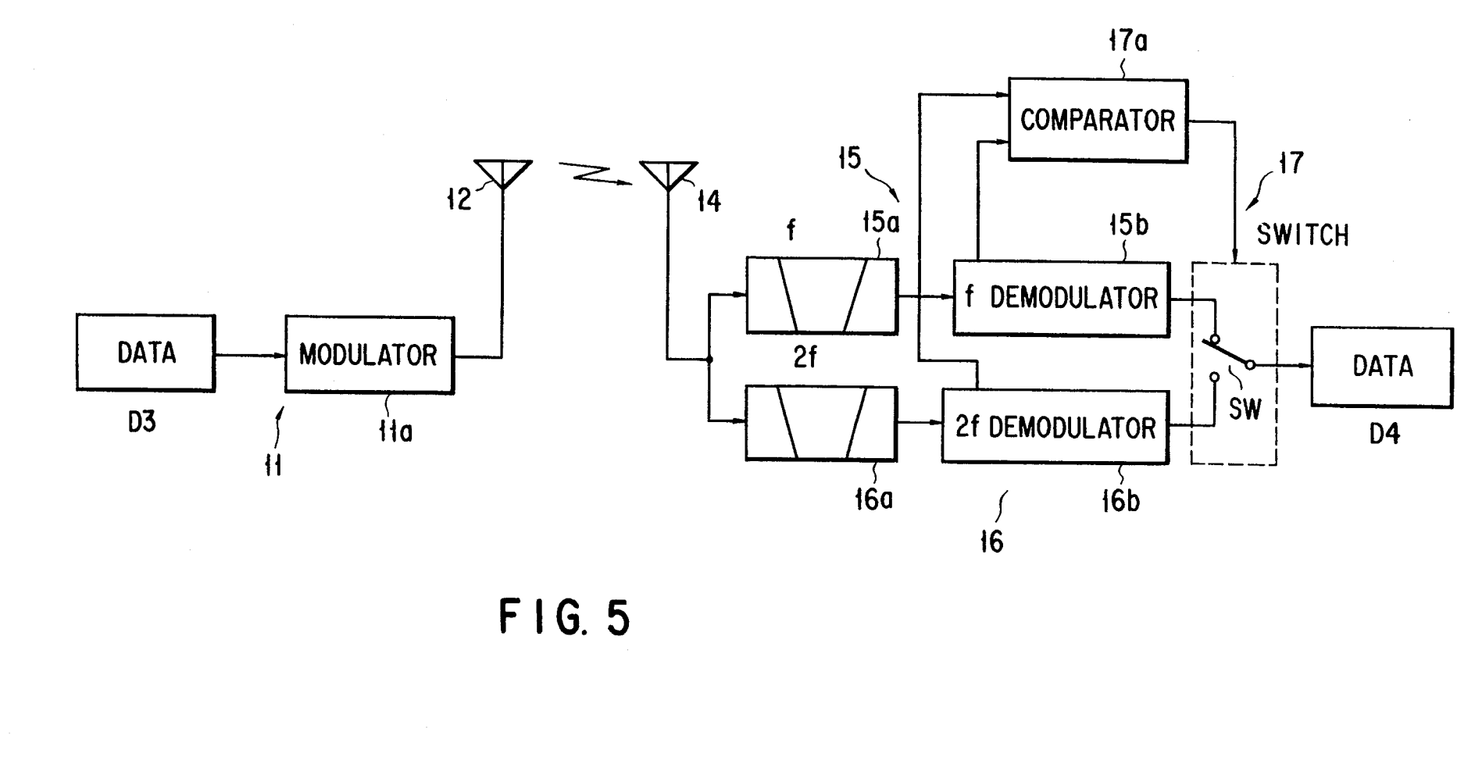
FIGS. 5, 6, and 7 are block diagrams respectively showing different practical arrangements of a harmonic-frequency communication system according to the present invention.

In FIG. 5, a modulator 11a of the transmitting section 11 is constituted as a BPSK modulator having an oscillator for oscillating a carrier (a fundamental wave) of a predetermined frequency, a mixer, and a double-wave selection amplifier. In this modulator 11a, a modulated output is produced such that data D3 from a data source and the carrier from the built-in oscillator are mixed by the built-in mixer, and the double wave is amplified by the built-in double-wave selection amplifier at the same level of the fundamental wave, thereby outputting a fundamental (modulated) wave f and double (modulated) wave 2f. The electromagnetic waves including the fundamental wave f and the double wave 2f are radiated into the air from the transmitting antenna 12 connected to the output terminal of the modulator 11a.

The electromagnetic waves including the fundamental wave f and the double wave 2f travel in the air, and they are received by the received antenna 14. Thereafter, the electromagnetic waves are branched into two signals, and the signals are guided to both the stationary contacts of the switch SW through a fundamental-wave band-pass filter 15a of the fundamental receiving section 15, a double-wave band-pass filter 16a of the double-wave receiving section 16, a fundamental-wave demodulator 15b, and a double-wave demodulator 16b. The switch SW included in the diversity section 17 selects one modulated output of better quality (in this case, the output has a higher level) in response to a control signal output from a comparator 17a for comparing the levels of the outputs from the fundamental-wave demodulator 15b and the double-wave demodulator 16b, thereby outputting the output as demodulated data D4 from a movable contact.

Figure 6:
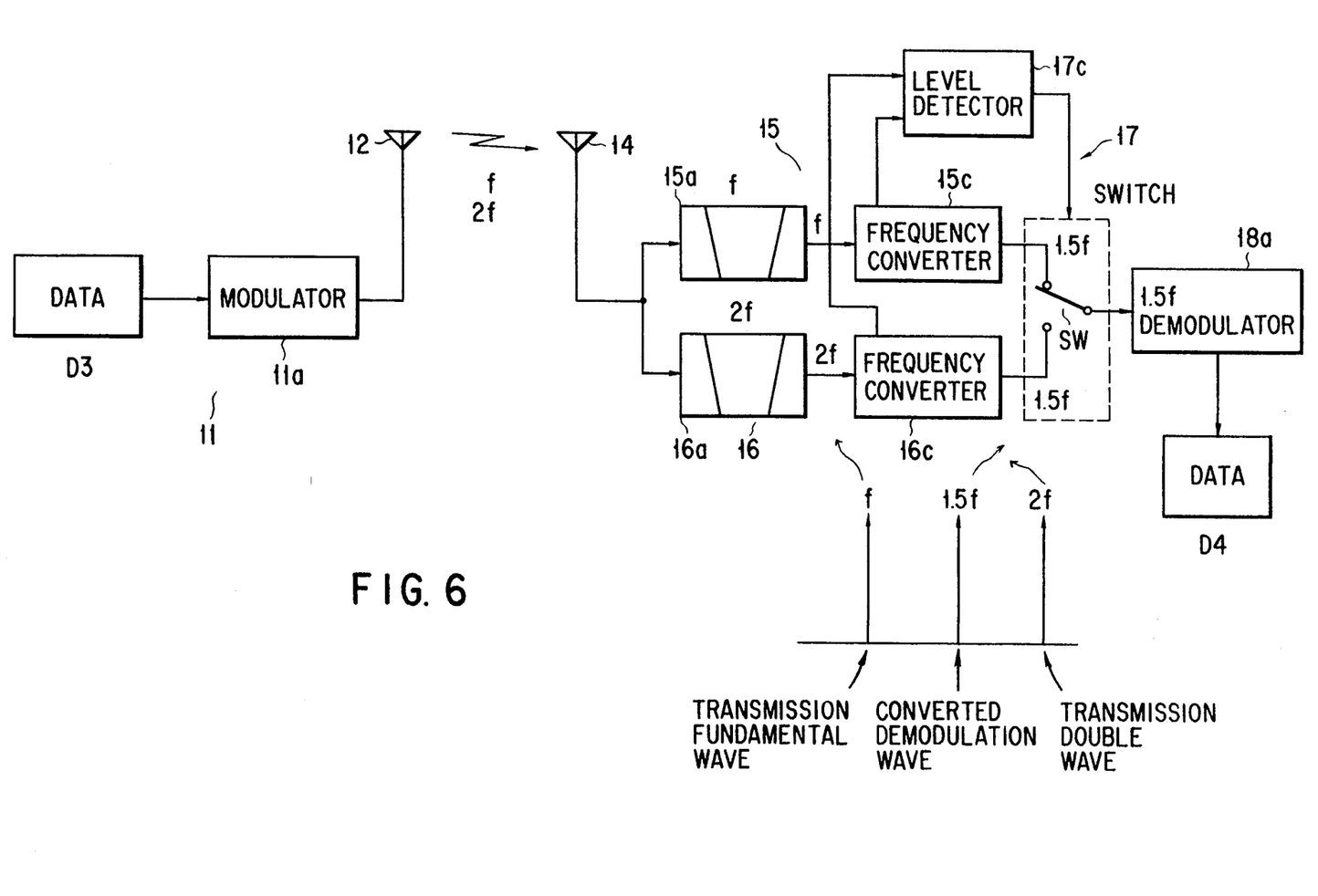

FIG. 6 shows the second practical arrangement of the first embodiment. In this practical arrangement, the arrangement and function of a path up to the fundamental-wave band-pass filter 15a and the double-wave band-pass filter 16a are the same as those of the first practical arrangement shown in FIG. 5.

In this arrangement, after the fundamental wave f and the double wave 2f passing through the band-pass filters 15a and 16a are converted into signals each having an intermediate frequency (1.5f) between the frequencies of these waves, respectively, the signals are guided to both the stationary contacts of the switch SW. In this case, the SW included in the diversity section 17 selects one 1.5f converted output of better quality (in this case, the output has a higher level) in response to a control signal output from a level detector 17c for detecting and comparing the input or output levels of the frequency converters 15c and 16c, thereby outputting the 1.5f output of better quality to a 1.5f demodulator 18a. This 1.5f demodulator 18a demodulates the 1.5f signal and outputs it as the data D4.

That is, according to this practical arrangement, the same effect as described above can be obtained by only one demodulator.

Figure 7:
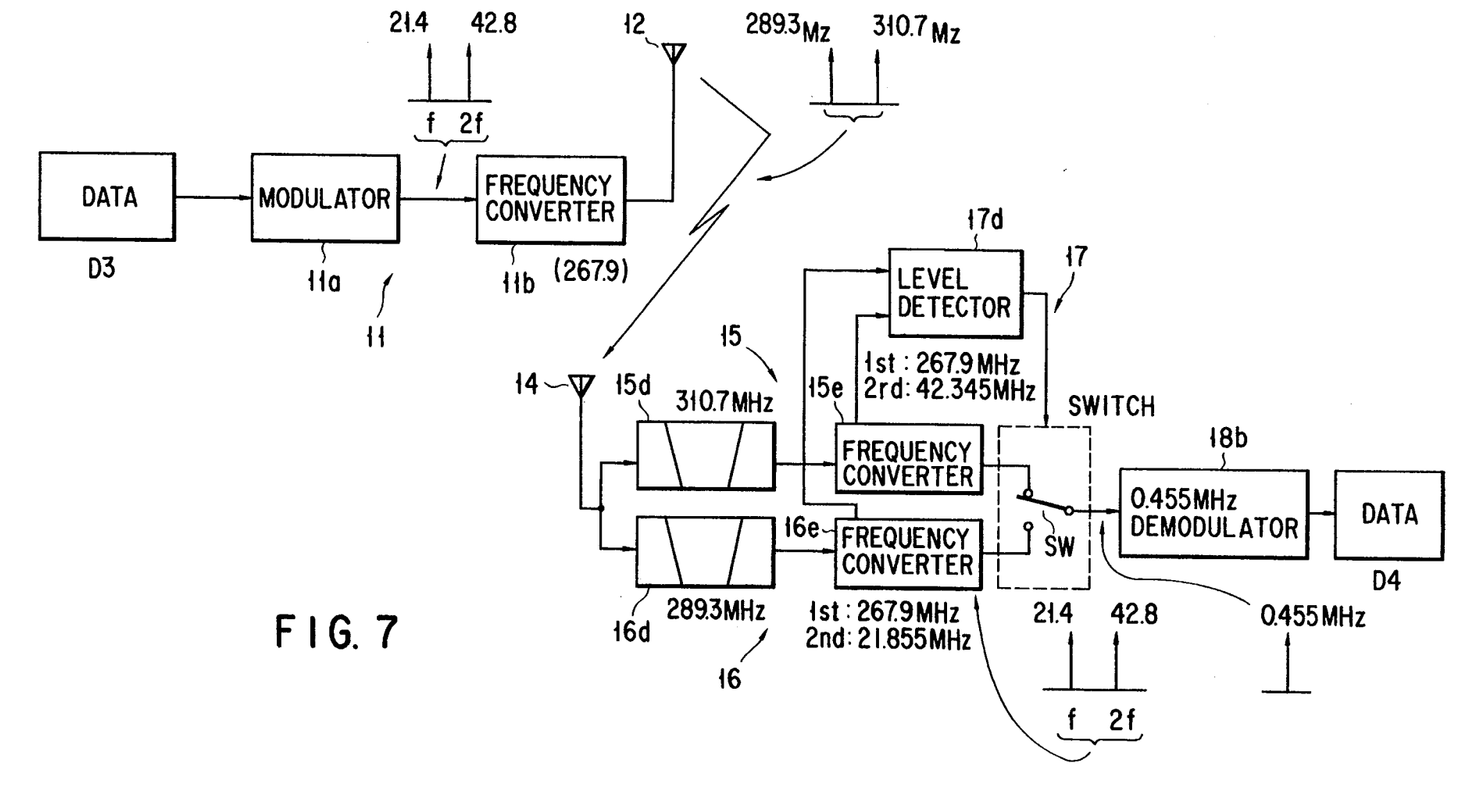

FIG. 7 shows the third practical arrangement of the first embodiment.

In this practical arrangement, outputs f and 2f (in this case, f=21.4 MHz, 2f=42.8 MHz) from the same modulator 11a of the transmitting section as that of FIG. 5 are guided to a frequency converter 11b, and the outputs f and 2f are converted by a local oscillation signal having a predetermined frequency (in this case, 267.9 MHz) into transmission waves respectively having predetermined frequencies (in this case, f'=289.3 MHz, 2f'=310.7 MHz). These transmission waves are transmitted from the transmitting antenna 12.

The receiving section 16 for receiving the transmission waves including the two frequency-converted waves at the receiving antenna 14 are branched and input to band-pass filters 15d and 16d respectively having predetermined frequency characteristics (in this case, 310.7 MHz and 289.3 MHz).

The outputs passing through the band-pass filters 15d and 16d are frequency-converted twice by first and second frequency converters 15e and 16e having frequency converting units, respectively. At this time, since both the first frequency conversion operations are performed using a local oscillation signal having a frequency of 267.9 MHz, the outputs are converted into signals having frequencies of 42.8 MHz (f) and 21.4 MHz (2f), respectively. In the second conversion operations, a local oscillation signal having a frequency of 42.345 MHz is used in the converter 15e, and a local oscillation signal having a frequency of 21.855 MHz is used in the converter 16e. Therefore, signals each having a frequency of 0.455 MHz are output from both the converters 15e and 16e and supplied to both the stationary contacts of the switch SW. The SW included in the diversity section 17 selects one converted output (0.455 MHz) of better quality (in this case, the output has a higher level) in response to a control signal from a level detector 17d for detecting the input or output levels of the frequency converters 15e and 16e and converting the levels, and outputs the output to a demodulator 18b. This demodulator 18b demodulates the signal having a frequency of 0.455 MHz to output the data D4.

In the second and third embodiments, several practical arrangements according to the practical arrangements of the first embodiment can be developed.

In order to obtain a diversity effect, one wave of better quality is not necessarily selected from a fundamental wave and a harmonic wave (especially a double wave) thereof by a receiving section. Both the waves may be synthesized each other to obtain the diversity effect as in the second embodiment. More specifically, when the fundamental wave and the harmonic wave are synthesized in phase, the diversity effect can be further increased.

Note that the frequencies described in the third practical arrangement represent only examples, and frequencies falling within a range on a MHz order to a GHz order can be applied.

As described above, according to the present invention, communication well protected against interference waves and fading is realized with an improved diversity scheme by a compact system obtained by simplifying a transmitting section improved without using a plurality of transmitting sections for transmitting a plurality of carriers.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A harmonic-frequency communication system, comprising:

a transmitting section including:
  modulation means for modulating a carrier serving as a fundamental frequency wave with data to be transmitted, to generate a modulated output including at least the fundamental frequency wave and a double frequency wave included in harmonic frequency waves of the fundamental frequency; and
  transmitting antenna means for radiating electromagnetic waves into the air, the electromagnetic waves including the fundamental frequency wave and the double frequency wave included in the modulated output generated by the modulations means; and a receiving section including:
  receiving antenna means for receiving the electromagnetic waves including the fundamental frequency wave and the double frequency wave radiated from said transmitting antenna means;
  diversity means for processing the fundamental frequency wave and the double frequency wave included in the electromagnetic waves received by said receiving antenna means,
  said diversity means including:
    an oscillator for oscillating a local oscillation signal having a frequency $f_{Lo}$ when the fundamental frequency wave and the double frequency wave have frequencies $f_1$ and $f_2$, respectively; and
    a mixer for mixing the fundamental frequency wave and the double frequency wave with the local oscillation signal to output a synthesized signal of mixed signals respectively having frequencies $f_1+f_{LO}$ and $f_2-f_{LO}$, where the frequency $f_{LO}$ is set to satisfy condition $f_1+f_{LO}=f_2-f_{LO}$, and demodulation means for demodulating the synthesized signal output from said diversity means, thereby outputting data which is the same as the data to be transmitted.

2. A system according to claim 1, wherein said modulation means includes means for causing the double frequency wave to have the same amplitude level as that of the fundamental frequency wave.

3. A system according to claim 1, wherein said diversity means includes means for substantially selecting one wave of better quality from the fundamental frequency wave and the double frequency wave.

4. A harmonic-frequency communication system, comprising:

a transmitting section including:
  modulation means for modulating a carrier serving as a fundamental frequency wave with data to be transmitted, to generate a modulated output, including at least the fundamental frequency wave and a double frequency wave included in harmonic frequency waves of the fundamental frequency; and
  transmitting antenna means for radiating electromagnetic waves into the air, the electromagnetic waves including the fundamental frequency wave and the double frequency wave included in the modulated output generated by the modulations means; and a receiving section including:
  receiving antenna means for receiving the electromagnetic waves including the fundamental frequency wave and the double frequency wave radiated from said transmitting antenna means;
  diversity means for processing the fundamental frequency wave and the double frequency wave included in the electromagnetic waves received by said receiving antenna means,
  said diversity means including:
    a first band-pass filter for filtering the fundamental frequency wave;
    a second band-pass filter for filtering the double frequency wave;
    first and second frequency converters for converting outputs from said first and second band-pass filters into outputs having the same frequency which is an intermediate frequency of the fundamental and double frequency waves;
    a level detector for detecting and comparing signal levels from the outputs or inputs of said first and second frequency converters to generate a control signal; and
    switching means for selecting any one output of outputs from said first and second frequency converters in accordance with the control signal from said level detector, and
  demodulation means for demodulating the output selected by said diversity means, thereby outputting data which is the same as the data to be transmitted.

5. A system according to claim 4, wherein said modulation means includes means for causing the double frequency wave to have the same amplitude level as that of the fundamental frequency wave.

6. A system according to claim 4, wherein said diversity means includes means for substantially selecting one wave of better quality from the fundamental frequency wave and the double frequency wave.

7. A harmonic-frequency communication system, comprising:

a transmitting section including:
  modulation means for modulating a carrier serving as a fundamental frequency wave with data to be transmitted, thereby to generate a modulated output including at least the fundamental frequency wave and a double frequency wave included in harmonic frequency waves of the fundamental frequency; and
  frequency converting means for converting the fundamental frequency wave and the double frequency wave included in the modulated output generated by said modulation means into first and second signals each having a predetermined frequency higher than that of the fundamental and double frequency waves; and
  transmitting antenna means for radiating electromagnetic waves into the air, the electromagnetic waves including the first and second signals converted by said frequency converting means; and a receiving section including:

receiving antenna means for receiving the electromagnetic waves including the first and second signals radiated from said transmitting antenna means;

diversity means for processing the first and second signals included in the electromagnetic waves received by said receiving antenna means, said diversity means including:

a first band-pass filter for filtering the first signal;

a second band-pass filter for filtering the second signal;

first and second frequency converters for respectively converting outputs from said first and second band-pass filters into outputs having the same frequency, which is lower than that of the fundamental frequency wave;

a level detector for detecting and comparing signal levels from the outputs or inputs of said first and second frequency converters to generate a control signal; and switching means for selecting any one output of outputs from said first and second frequency converters in accordance with the control signal from said level detector, and demodulation means for demodulating the output selected by said diversity means, thereby outputting data which is the same as the data to be transmitted.

8. A system according to claim 7, wherein said modulation means includes means for causing the double frequency wave to have the same amplitude level as that of the fundamental frequency wave.

9. A system according to claim 7, wherein said diversity means includes means for substantially selecting one wave of better quality from the fundamental frequency wave and the double frequency wave.

10. A system according to claim 7, wherein each of said first and second frequency converters includes means for performing a first conversion operation to obtain signals respectively having frequencies equal to the fundamental frequency wave and the double frequency according to the outputs from said first and second band-pass filters and performing a second conversion operation to obtain signals having the same frequency according to the signals obtained by the first conversion operation.

* * * * *